United States Patent
Otto

(10) Patent No.: US 7,291,016 B2
(45) Date of Patent: Nov. 6, 2007

(54) OPHTHALMIC SURGERY SIMULATION DEVICE

(75) Inventor: Clifton S. Otto, Lakewood, WA (US)

(73) Assignee: United States of America as Represented by the Secretary of the Army, Washington, DC (US)

( * ) Notice: Subject to any disclaimer, the term of this patent is extended or adjusted under 35 U.S.C. 154(b) by 373 days.

(21) Appl. No.: 11/030,184

(22) Filed: Jan. 7, 2005

(65) Prior Publication Data

US 2005/0196741 A1    Sep. 8, 2005

Related U.S. Application Data

(60) Provisional application No. 60/534,961, filed on Jan. 9, 2004.

(51) Int. Cl.
G09B 23/28    (2006.01)

(52) U.S. Cl. ........................... 434/271; 434/270

(58) Field of Classification Search ................ 434/262, 434/271; 446/301, 341, 343, 346, 349, 389, 446/392

See application file for complete search history.

(56) References Cited

U.S. PATENT DOCUMENTS

| | | | | |
|---|---|---|---|---|
| 3,480,971 A * | 12/1969 | Smith | ........................ | 623/6.64 |
| 4,601,673 A * | 7/1986 | Nasca | ........................ | 446/389 |
| 4,865,552 A * | 9/1989 | Maloney et al. | ............. | 434/271 |
| 4,900,287 A * | 2/1990 | Fusi et al. | .................. | 446/183 |
| 5,137,459 A * | 8/1992 | Zirm | .......................... | 434/271 |
| 5,868,580 A * | 2/1999 | Amrein et al. | .............. | 434/271 |
| 5,893,719 A * | 4/1999 | Radow | ...................... | 434/271 |
| 6,210,169 B1 * | 4/2001 | Yavitz | ........................ | 434/271 |
| 6,485,142 B1 * | 11/2002 | Sheehy et al. | .............. | 351/203 |
| 6,589,057 B1 * | 7/2003 | Keenan et al. | .............. | 434/271 |
| 6,887,083 B2 * | 5/2005 | Umeyama et al. | .......... | 434/271 |

* cited by examiner

*Primary Examiner*—Kurt Fernstrom
(74) *Attorney, Agent, or Firm*—Elizabeth Arwine

(57) ABSTRACT

This invention relates to a device for simulating life-like conditions during eye surgery. The device includes a prosthetic head which includes an eye socket coupled to a fluid line adapted to create negative pressure or a vacuum in the eye socket. An eye for practicing surgical techniques can be placed in the socket and negative pressure used to hold the eye in the socket in a manner which feels analogous to the way an eye feels to a surgeon operating on a live human.

17 Claims, 3 Drawing Sheets

OPHTHALMIC SURGERY SIMULATION DEVICE

This application claims the benefit of priority under 35 U.S.C. §119(e) to U.S. provisional application Ser. No. 60/534,961 filed Jan. 9, 2004.

I. FIELD OF THE INVENTION

The present invention relates to devices for simulating ophthalmic surgery conditions and methods of using the same. More particularly, the present invention relates to prosthetic devices for simulating the conditions of the eye of a live human or other animal for purposes of practicing ophthalmologic surgery techniques.

II. BACKGROUND OF THE INVENTION

As will be appreciate, the margin of error during surgery is miniscule. This is particularly true with eye surgery. The eye is a small and complicated organ that is very delicate and sensitive on which to operate. The slightest error could permanently damage the eye and result in impaired vision or blindness. To avoid surgical mishaps, the training of surgeons, including ophthalmic surgeons, is a multi-year, rigorous regime of study and practice. The development and honing of the necessary surgical skills and expertise requires hands on training and practice in life-like settings.

Certain types of surgery readily lend themselves to practice on cadavers or animal models. For example, practicing incisions in the torso to avoid piercing critical organs or practicing the suturing of tissues, may be accomplished on cadavers, animal models, or the like. Surgical students showing promise with these skills may then begin to develop greater dexterity and precision by practicing their incision and suturing techniques on live patients needing treatment in areas and under conditions where the patient's life and well being is not at risk. As techniques are mastered, students progress to more complicated and delicate procedures until they reach a point of being aptly trained to perform as highly-skilled surgeons.

As will be appreciated, ophthalmology is one area of practice that is somewhat ill-suited for cadaver and animal-based training. Also, the eye is a particularly delicate organ on which to allow an untrained hand to operate. Accordingly, the clinical hands-on training with live patients applicable in many surgical areas is not particularly palpable with eye surgery. Some of the difficulties associated with practicing surgical techniques on the eye is based on the anatomical differences in animal and human eyes and the inability to simulate the conditions of the eye in a living patient with a cadaver. For example, the way an eye is held and reacts in the socket of a living human is very different from that of a cadaver.

Even putting the drawbacks of cadaver training aside, the human eye is a transplantable organ in great demand and limited availability. In today's climate, the gift of sight is given to many in need through transplantation. Indeed, human corneas are now routinely transplanted to save the sight of many older Americans. The ever increasing need of putting transplantable organs to their highest and best use leads to fewer human eyes available for surgical practice by promising surgeons, while creating a greater demand for surgeons capable of performing the delicate harversting and transplantation procedures.

There are two current techniques for practicing ocular surgical procedures and anterior segment surgery. The first involves the use of an animal or cadaver eyeball placed in a socket of a Styrofoam replicate of a human head. With this technique, a life-sized replicate of a human head is provided having an eye socket mimicking the contours, depth and features of an actual human eye socket. An animal or cadaver eye is placed in the socket and pinned or sutured in the socket to hinder movement of the eye during practice. However, as will be appreciated, one drawback of this method is that it does not provide enough stability to hold the eye in place during complex suturing exercises, or during the use of phacoemulsification machines, or other techniques which place significant pressure and torsion on the eye.

The second technique uses a flat platform plastic suction device. These devices use a suction ring set in a plastic base that is attached by tubing to a large syringe. Suction is applied to an eyeball placed in the ring by withdrawing the syringe plunger and clamping the connected tubing when sufficient vacuum is achieved. While the devices are capable of holding an eyeball securely in place, this technique provides only a static degree of vacuum that is difficult to change during surgical exercises. Moreover, as will be appreciated, another disadvantage of flat platform suction devices is that they share no similar anatomic features to the human head and are thus of limited utility in training.

Accordingly, there exists a long-felt, yet unresolved need for an improved device and method for practicing ophthalmic surgical techniques. Moreover, there exists a need in the art for a device capable of simulating more life-like conditions for practicing ophthalmic surgical techniques.

III. SUMMARY OF THE INVENTION

The present invention overcomes the serious practical problems described above and offers new advantages as well. One object of the invention is to provide an improved means for practicing ophthalmic surgical techniques. Another object of the invention is to provide a device for simulating life-like eye conditions for practicing surgical conditions on cadaver or animal eyes. These and other objects, aspects and features of the invention may be realized by the provision of a prosthetic head having an eye socket for receiving and retaining an eyeball.

According to one aspect of the invention, the prosthetic head comprises a Styrofoam head customarily used for displaying wigs. In an alternate embodiment, the prosthetic head comprises a mannequin or like synthetic head. In another embodiment, the prosthetic head comprises a trauma mannequin. According to the invention, an advantageous feature of the invention is the provision of an eye socket(s) in the prosthetic head adapted to receive an eye. In one embodiment the socket is configured to hold an eye, either animal or cadaver, in a manner similar to the human head.

Another advantageous feature of the invention is the coupling of the eye socket with a means for creating suction pressure to hold the eye in the socket. In one embodiment of the invention, the suction means comprises fluid-tight tubing in communication with the socket. According to this embodiment, the tubing is adapted to be couplable to a means for creating negative pressure in the socket. In an alternate embodiment, the suction means is integral with the tubing. Preferably, the socket is sized in the back to allow an eye to be held in the socket in an orientation and depth similar to the human skull while sealing an opening in communication with said tubing. According to another embodiment, the eye socket is provided with an insert. The insert is preferably removable and used to position smaller eyes, such as cadaver eyes, in a more realistic anterior position than would be in a socket configured to hold larger animal eyes, such a pig eyes.

Any suitable means for creating a negative pressure may be used with the invention. For example, the tubing may be coupled to an empty syringe which is aspirated to cause suction in the socket. More preferably, the tubing is adapted to be coupled to the suction of an operating room, whereby the amount of suction applied to the eye may be varied or adjusted during the procedures.

According to an aspect of the invention, the tubing and/or suction means includes a pressure gauge for monitoring and/or modifying the pressure supplied to the socket.

Given the following enabling description of the drawings, the apparatus should become evident to a person of ordinary skill in the art.

IV. BRIEF DESCRIPTION OF THE DRAWINGS

The present invention is described with reference to the accompanying drawings. In the drawings, like reference numbers indicate identical or functionally similar elements.

V. DETAILED DESCRIPTION OF THE DRAWINGS

The present invention is based, in part, on the discovery that the provision of suction to an eye socket of an anatomical replication of a human head is capable of more accurately simulating life-like conditions for the practicing of ocular surgical techniques. The present invention is also based in part on the discovery that the provision of a means for altering or adjusting the suction, negative pressure or vacuum pressure supplied to the socket may advantageously aid the training of surgeons for conditions which may be encountered when operating on live patients.

Figure 5:
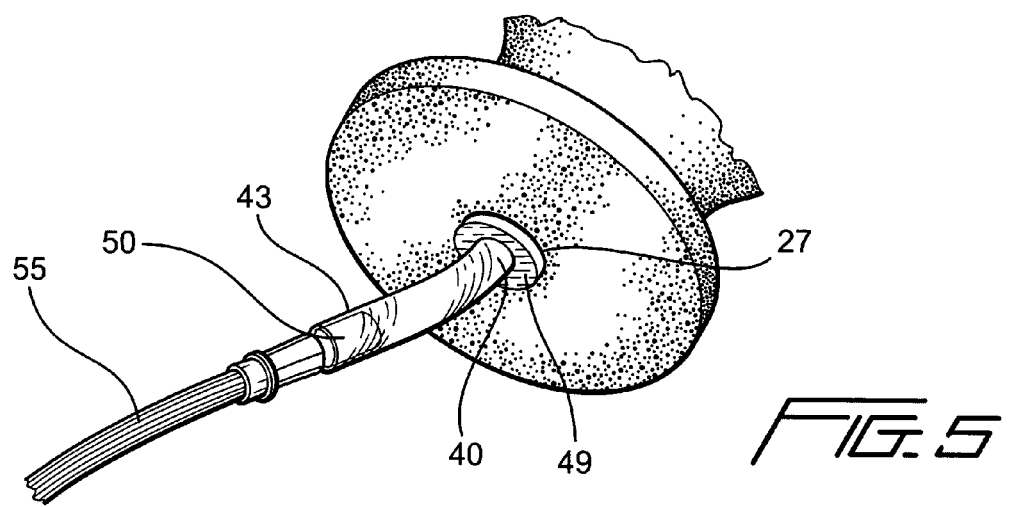
FIG. 5 is a close-up view of the base an ophthalmic surgery simulation device having its tubing coupled to wall suction tubing of an operating room.
Figure 2:
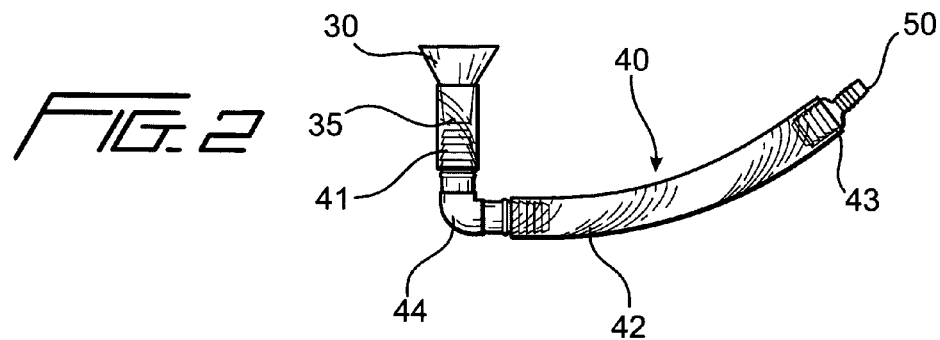
FIG. 2 is a side view of a suction eye holding device of an ophthalmic surgery simulation device according to the present invention.
Figure 6:
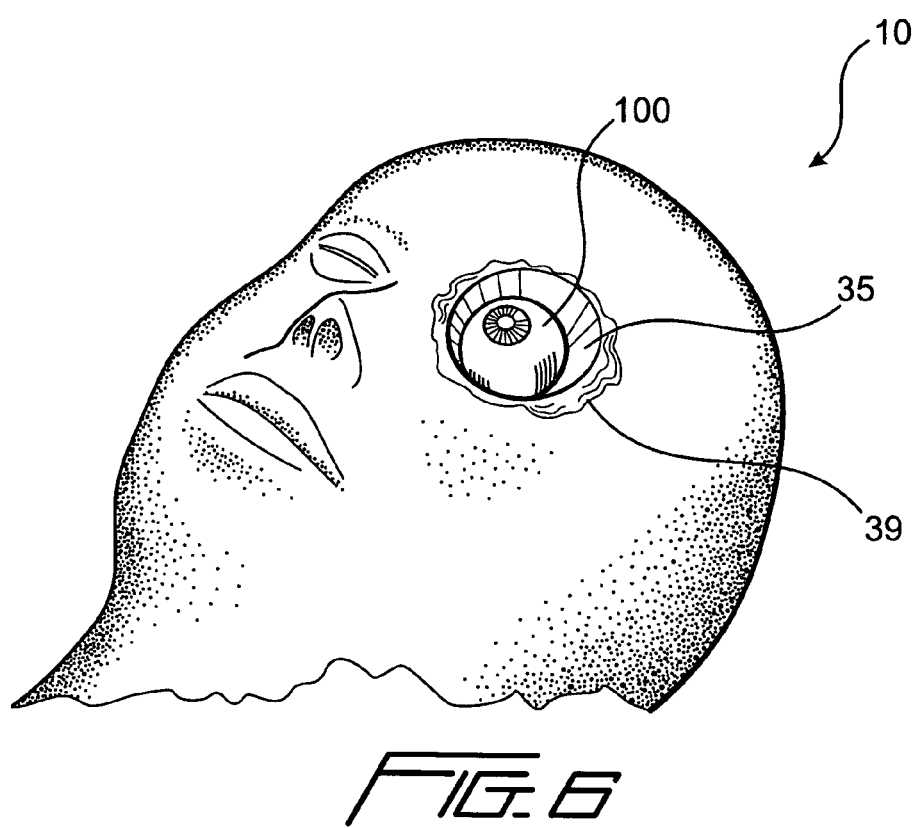
FIG. 6 is a perspective view of a prosthetic head of an ophthalmic surgery simulation device having a human eyeball positioned therein according to the present invention.

FIGS. 1-6 depict an operating embodiment of an ophthalmic surgery simulation device according to the invention. The reader should be warned that FIG. 6 is a photograph that depicts an actual human eyeball positioned in a manner for simulating surgery according to the invention. Those faint of heart may be prudent to avoid consulting FIG. 6 unless necessary.

As depicted, the simulation device 10 includes a prosthetic head 20 having at least one eye socket 30. In the embodiment depicted, the head 20 includes a left-eye socket 30, although the provision of a right-eye socket or both sockets is contemplated by the invention.

Prosthetic head 20 in this embodiment is a polystyrene or Styrofoam head of the type customarily used for displaying wigs. Accordingly, head 20 is readily available at next to no cost and easily adapted for use with the device 10. However, any prosthetic head capable of accommodating the advantageous features of the invention should be understood to be within the scope of the invention, including, for example, mannequin heads, torsos, trauma mannequins, store mannequins, crash test dummies, and/or full body dummies. Likewise, while the head 20 depicted is configured to be that of a human adult female, it will be readily appreciated that heads can be constructed to mimic the features of humans of any age, gender and appearance. Finally, if large-scale commercial production is desired, it is well within the ability of one of ordinary skill in the art to manufacture simulation devices incorporating the advantages features of the invention by known manufacturing and assembly techniques.

Figure 1:
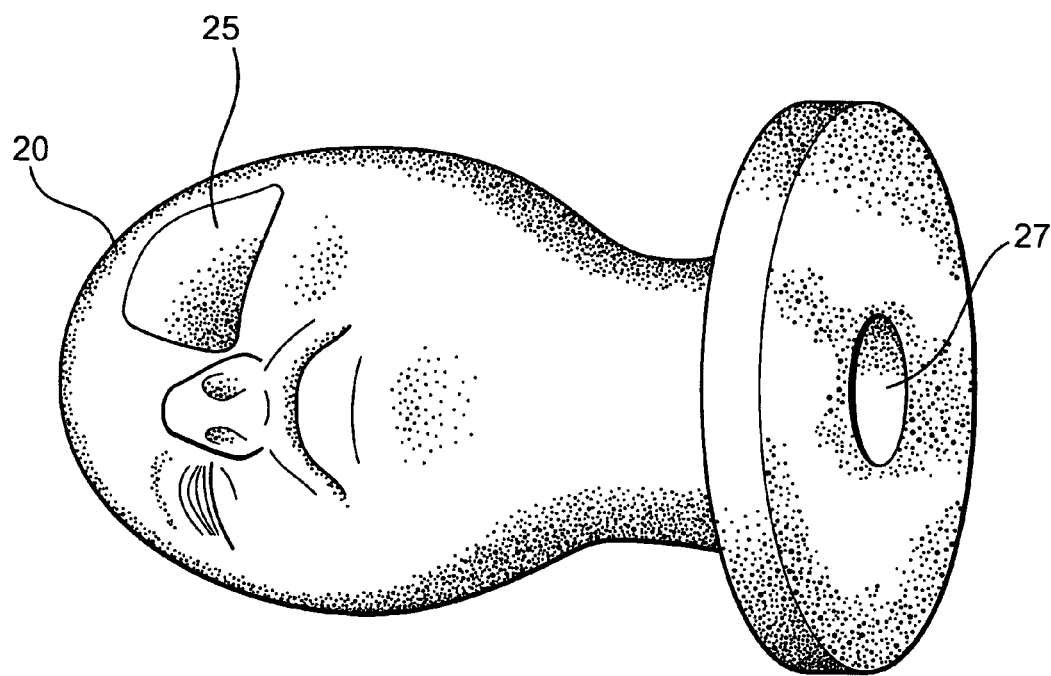
FIG. 1 is a perspective view of a prosthetic head of an ophthalmic surgery simulation device according to the present invention.
Figure 3:
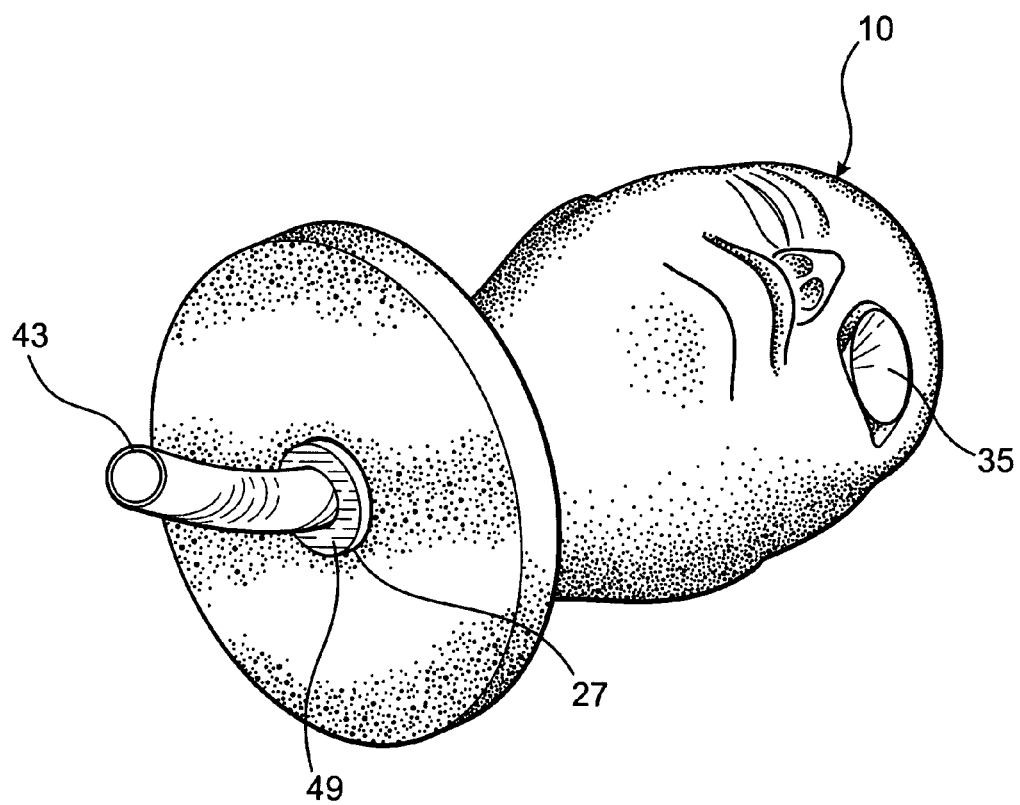
FIG. 3 is a perspective view of an assembled ophthalmic surgery simulation device according to the invention.

As best seen in FIG. 1, Styrofoam head 20 has been hollowed-out from an eye area 25 of the head through the interior 26 of the head to an opening 27 in the base of the head. Although an opening in the base of the head is shown, an opening suitable for use in connection with the present invention may be hollowed-out or provided in any other area of the head if it does not interfere with the operation and usefulness of the present invention as a simulation of surgical conditions a practitioner may encounter.

When using a Styrofoam or like material for the prosthesis, one way to hollow out the head is use a soldering iron (not shown) to create an opening 27 in the base of the head and continue advancing the iron to define a central core 26 through the interior of the head. The iron may then be removed from the central core and positioned adjacent the eye of the head and maneuvered to hollow-out an eye area 25 to a depth that meets the central core 26. Alternatively, the Styrofoam head 20 could be manufactured with the passageway. Likewise, if commercial, mass-production is desired, the prosthetic head according to the invention may be manufactured by injection molding, or the like, with the necessary passageways and features incorporated in the manufacturing process.

Figure 4:
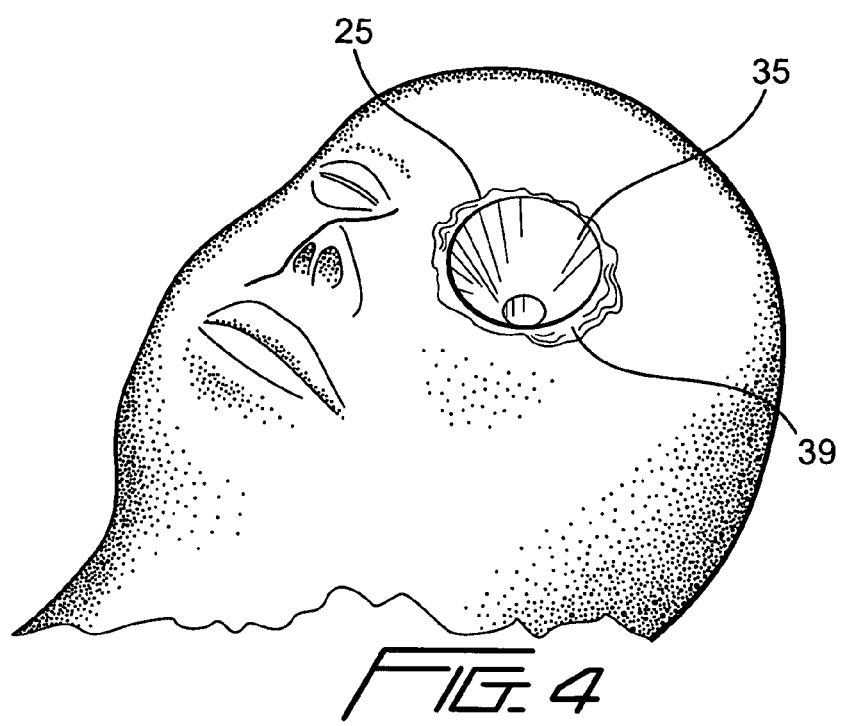
FIG. 4 is a close-up view of an eye socket of an ophthalmic surgery simulation device according to the invention.

The hollowed-out eye area 25 is preferably sized to allow for insertion of an artificial eye socket 30. In return, eye socket 30 is preferably sized and configured to hold an eye at the position and orientation of the human skull once inserted in the eye area 25 of head 20. Eye socket 30 is also preferably constructed of a material, such as rigid plastic, to allow for repeated use in practicing surgical techniques. In the embodiment depicted, eye socket 30 is generally funnel-shaped with an open neck 35 pointing towards the back of the head. However, any suitable shape may be used in practicing the invention. In the illustrated embodiment depicted, eye socket 30 comprises an 8 ounce plastic funnel that has been cut to a total length of 2 inches. As best shown in FIG. 4, eye socket 30 is held within the eye area 25 with silicone sealant 39. However, any suitable adhesive(s) or methods of securing eye socket may be used with the present invention. Moreover, if commercial production is desired, a suitable socket may be configured integral with the head during the manufacturing process.

Open apex 35 of eye socket 30 is provided to allow fluid-tight coupling to tubing 40. Tubing 40 includes a front portion 41 coupled to the open neck 35 of the eye socket 30, a central portion 42 which extends through the central core hollowed through the interior area 26 of the head 20, and a rear portion 43 which extends beyond the opening created in the neck area 27 of the head 20. In the illustrated embodiment depicted, front portion 41 of tubing comprises a 2-inch length of ⅝" plastic tubing with an internal diameter of ½". A plastic ½" external diameter 90-degree elbow 44 is inserted within the open end of the front portion. The central portion 42 of tubing is then coupled to, or inserted over, the distal end of the elbow 44. Although not critical to the invention, an elbow 44 is preferred to prevent the tubing from becoming kinked or occluded when suction is applied. Alternatively, the 90-degree elbow may be eliminated and a continuous length of tubing from the open apex to the adapter used instead.

In the illustrated embodiment, the rear portion 43 of the tubing is held in the opening 27 at the base of the head 20 by wrapping cloth or surgical towels 49 (FIG. 5) around the tubing. However, one of ordinary skill in the art will recognize that any suitable means for stabilizing the tubing 40 within the opening 27 of the head 20 can be used with the present invention. Although not critical to the invention, in the illustrated embodiment depicted, the distal end of the rear portion 43 is then attached to a ⅝" to ¼" tubing adapter 50. An adapter 50 is provided to facilitate communication with a means for providing suction to the tubing and eye socket 30.

In the illustrated embodiment, as best shown in FIG. 5, adapter 50 allows the tubing 40 to be coupled to wall suction 55 in an operating room setting. Thus, when an animal eyeball or cadaver eyeball is placed in eye socket 30, the suction will hold the eyeball firmly in place and allow ocular surgical techniques, such as cataract surgery or corneal suturing, to be practiced without the risk of the eye being dislodged. The combination of the realistic aspects of a surgical surface that closely resembles the human head with suction that can be applied directly to an animal or cadaver eyeball to prevent it from being displaced during surgical exercises provides the advantage of allowing more complex surgical procedures to be practiced in an environment more closely resembling actual operating conditions.

In addition, not only does the present invention provide a realistic surface that allows stabilization of an eyeball by means of suction, the present invention also provides the unexpected advantage of allowing the amount of suction being applied to the eye to be varied or adjusted. Because the suction apparatus of the invention may be attached to standard operating room wall-suction, the amount of suction being applied to the eyeball can be set to any desired amount. By increasing or decreasing the amount of suction applied to the eyeball, the amount of pressure inside the eye can also be increased or decreased, respectively. Pressure inside the eye can thereby be set to a variety of different settings before initiating practice and can also be changed during practice procedures to provide a dynamic and more realistic simulation of actual surgical conditions. The amount of suction applied depends on the size of the tubing, etc. It is well within the ability of the ordinarily skilled artisan to determine through trial and error or otherwise suitable values and durations for suction to be applied during a given procedure. Likewise, if wall suction or the like is not used, the tubing may be supplied with or in communication with a pressure gauge or other indication of pressure to allow a user to alter or modify the pressure as desired.

Any eye or facsimile thereof is capable of use with the present invention. FIG. 6 depicts a human eyeball 100 disposed in the socket 30 and ready for surgical practice. As will be appreciated, junior surgical students will preferably be practicing on animal eyes in view of the fact that they are more readily available and a less precious a resource as human eyes. More advanced students will ultimately be practicing advanced techniques on human eyes. The life-like conditions provided by the present invention will be of great assistance allowing surgeons to develop the dexterity needed when they ultimately must perform surgery on human patients.

Figure 7:
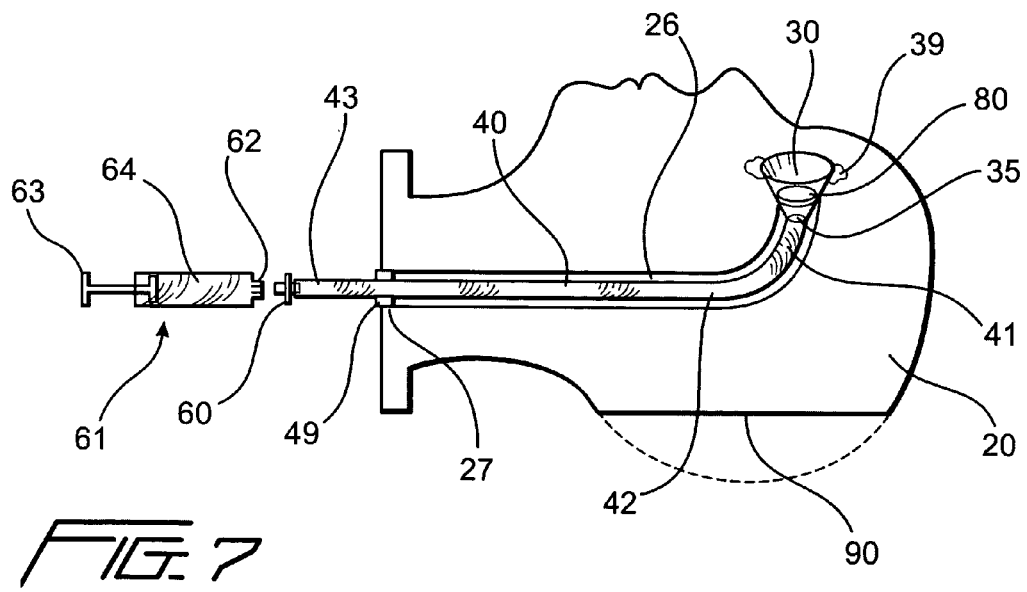
FIG. 7 depicts an alternative embodiment of an ophthalmic surgery simulation device according to the present invention.

In an alternative embodiment depicted in FIG. 7, it is possible to provide an adapter or plug 60 which is couplable to a tip 62 of a syringe 61. Syringe 61 is empty when coupled to plug 60 and then the plunger 63 of the syringe 61 is withdrawn to aspirate air from tubing 40. The removal of air into the body 64 of syringe 61 creates negative pressure at the eye socket 30. The tubing 40 may then be clamped or sealed closed to provide sustained vacuum. If an eye (as shown in FIG. 6) is disposed in the socket, the eye will plug the open apex 35 and create a fluid tight seal. This sealing will hold the eye in the socket in a manner sufficient for certain surgical techniques to be practiced. This embodiment may be preferred in situations and teaching circumstances in which wall suction or the like are unavailable. Although not shown, a pressure gauge or intake may be provided with tubing or syringe to allow a user to alter or vary the pressure supplied to the socket as desired.

As depicted in FIG. 7, an eye-socket insert 80 may be provided. Preferably, eye socket insert 80 is configured to hold an eye in a position anterior of the funnel in a manner similar to a position encountered during surgery. In embodiments where the funnel is sized to receive pig eyes, or other animal eyes larger than those of cadavers, the use of an eye socket insert may be preferable to prevent the eye from being held in a position too deep in the funnel to allow for life-like surgical conditions. The eye-socket insert 80 may be adjustable such that it can be manipulated to hold any sized eye in a proper orientation. Alternatively, a plurality of differently sized eye-socket inserts may be provided, wherein a given insert is selected based on the eye it will be holding. Accordingly, the insert is sized to hold a given type of animal eye in a desired orientation. Alternatively, although not shown, the eye-socket funnel could be made removable such that different sized funnels could be inserted and used depending on the size of the eye to be operated on.

As also depicted in FIG. 7, head 20 may have a portion of its back flattened. A flattened area 90 may be useful in allowing the head 20 to be secured and held stable to a surgical table or the like more easily than that of head having a rounded back. Preferably, around 20% of the back of the head can be removed to create a flat surface that allows for realistic securing of head 20 for surgical practice. Alternatively, as will be appreciated, the head can be manufactured, molded, or otherwise configured to have a flat surface or other means to aid securing the head in place, for example, a separate head holder or stand to hold the head securely in place.

Those skilled in the art will appreciate that various adaptations and modifications of the above-described preferred embodiments can be configured without departing from the scope and spirit of the invention. Therefore, it is to be understood that, within the scope of the appended claims, the invention may be practiced other than as specifically described herein.

I claim:

1. An ophthalmic surgery simulation device comprising:
a prosthetic head having an eye socket; and
a fluid tight conduit extending from said socket; wherein when suction or negative pressure is applied to said conduit, an object disposed in said socket is held in said socket in proportion to said suction or negative pressure.

2. The simulation device of claim 1 wherein said eye socket is generally funnel-shaped and includes an open neck in communication with said conduit.

3. The simulation device of claim 2 further comprising wall suction tubing coupled to said conduit.

4. The simulation device of claim 3 wherein said conduit passes through the interior of said head.

5. The simulation device of claim 2 wherein said socket comprises plastic and said conduit is plastic tubing.

6. The simulation device of claim 5 wherein said tubing includes a port for mating with a syringe.

7. The simulation device of claim 1, wherein said prosthetic head comprises a polystyrene wig-head.

8. The simulation device of claim 1, wherein said prosthetic head comprises a molded head.

9. The simulation device of claim 3, wherein said conduit extends to the back of the head.

10. The simulation device of claim 1, wherein said object disposed in said socket is an eye.

11. A method of simulating ophthalmic surgery comprising:
positioning an eye in an artificial socket of a simulation head; and
applying negative pressure or suction to said socket.

12. The method of claim 11, wherein said head and socket are configured to resemble a human head and eye socket.

13. The method of claim 12, wherein said head is adapted to resemble a head selected from the group consisting of an adult female's head, an adult male's head, a female child's head, a male child's head, and an infants head.

14. The method of claim 11, wherein applying said negative pressure includes the step of supplying suction to a fluid line in communication with said socket by coupling said fluid line with wall suction.

15. The method of claim 14, further comprising the step of varying the amount of suction supplied to said socket.

16. The method of claim 11, wherein said applying said negative pressure comprises aspirating said tubing with a syringe.

17. A method of making a ophthalmic surgery simulation device comprising:
hollowing out a channel from an eye area of a prosthetic head to a distal area;
disposing an eye socket in said head; and
disposing a conduit in said channel configured to supply suction to said socket.

* * * * *